United States Patent [19]
Houdoin et al.

[11] Patent Number: 5,499,235
[45] Date of Patent: Mar. 12, 1996

[54] METHOD FOR THE SIMULATION OF TRANSMISSION ON A TRANSMISSION NETWORK WORKING IN ASYNCHRONOUS TRANSFER MODE AND SIMULATOR OF TRANSMISSION ON SUCH A NETWORK

[75] Inventors: Thierry Houdoin, Pleumeur Bodou; Jean-Yves Cochennec, Trebeurden, both of France

[73] Assignee: France Telecom, Paris, France

[21] Appl. No.: 168,033

[22] Filed: Dec. 15, 1993

[30] Foreign Application Priority Data

Dec. 16, 1992 [FR] France ................... 92 15178

[51] Int. Cl.⁶ .................... H04J 3/14; H04L 12/26; H04L 12/56
[52] U.S. Cl. .................... 370/13; 370/60.1; 370/79; 370/94.2
[58] Field of Search .................... 370/13, 14, 17, 370/58.1, 58.2, 58.3, 60, 60.1, 61, 62, 68.1, 79, 84, 94.1, 94.2, 110.1, 112; 371/2.1, 15.1, 20.1, 20.2, 20.4, 21.1, 21.2, 21.6, 23, 24, 25, 27, 29.1, 37.1, 40.1, 40.2, 41

[56] References Cited

U.S. PATENT DOCUMENTS

| | | | |
|---|---|---|---|
| 4,956,839 | 9/1990 | Torii et al. | 370/60 |
| 5,099,475 | 3/1992 | Kozaki et al. | 370/60 |
| 5,136,584 | 8/1992 | Hedlund | 370/94.1 |
| 5,163,057 | 11/1992 | Grupp | 370/13 |
| 5,271,000 | 12/1993 | Engbersen et al. | 370/13 |
| 5,313,454 | 5/1994 | Bustini et al. | 370/13 |
| 5,317,563 | 5/1994 | Oouchi et al. | 370/17 |
| 5,343,463 | 8/1994 | van Tetering et al. | 370/13 |

*Primary Examiner*—Alpus Hsu
*Attorney, Agent, or Firm*—Nilles & Nilles

[57] ABSTRACT

A method for the simulation of transmission on an ATM transmission network and a simulator implementing the method. The simulator includes interfaces for connection with this network, there is generated a digital signal with a format and bit rate corresponding to the standards of transmission on the network, the signal being constituted by cells identifiable by headers, error-generation and the processing of this signal in order to introduce these errors therein. Application to the testing of ATM terminals.

51 Claims, 6 Drawing Sheets

METHOD FOR THE SIMULATION OF TRANSMISSION ON A TRANSMISSION NETWORK WORKING IN ASYNCHRONOUS TRANSFER MODE AND SIMULATOR OF TRANSMISSION ON SUCH A NETWORK

BACKGROUND OF THE INVENTION

1. Field of the Invention

The present invention relates to a method for the simulation of transmission on an ATM (asynchronous transfer mode) type of transmission network. It also relates to a simulator of transmission on such a network.

2. Description of the Prior Art

It is recalled in this respect that an ATM network enables the transmission of digital information elements having varied bit rates that may be high, and may indeed go up to 155 Mbits/s.

It is also recalled that transmission in ATM mode is achieved by the transfer of fixed-length information units. The elementary quantity of information transmitted is 48 bytes. The information unit transmitted by ATM is called a cell and is identified by a five-byte label that is also known as a header. The total length of a cell is therefore 53 bytes.

It may be recalled also that there are two other major classes of digital transmission modes at the present time. These are the 64 bit/s circuit mode and the packet mode used, for example, by the Transpac network.

Transmission in ATM mode has the flexibility of transmission of the packet mode which enables transmissions at varied bit rates and, at the same time, ensures the simplicity of the protocols of the circuit mode.

At present, this transmission mode is not yet operational, and research work to study the characteristics of this network has been undertaken by the Applicant in order to devise and perfect ATM mode transmission/reception sources, i.e. more specifically the terminals connected to a network such as this, whether or not it is a local network.

To resolve this problem, the Applicant has had the idea of carrying out a simulation of the ATM mode transmission network and, notably, of simulating the connection of the network to such terminals and of simulating a two-way transmission in ATM mode between two terminals.

SUMMARY OF THE INVENTION

More particularly, an object of the invention is a method for the simulation of transmission on an asynchronous transfer mode transmission network, consisting chiefly in:

simulating the connection to this network, generating a digital signal with a format and bit rate corresponding to the standards of transmission on the network, the signal being constituted by cells identifiable by a header, generating errors and processing the signal generated in order to introduce these errors therein.

According to the method, the simulation of the connection to the network by a terminal consists, at reception, in:

matching the rate of arrival of cells coming from the transmitter terminal to the rate of the generated cells;

multiplexing the cells received from the generated cells to obtain the digital signal with a format and bit rate corresponding to the standards of the network.

According to the method, the simulation of the connection to the network by a terminal consists, at transmission, in:

identifying, in the generated digital signal, cells intended for a reception terminal;

transmitting the identified cells to this terminal at the rate of reception by the terminal.

According to another aspect of the invention, the method consists in simulating the transmission in both directions of transmission, from a terminal A towards a terminal B and in the reverse direction.

According to another characteristic of the invention, the network error generation consists in generating binary errors and/or cell errors and/or variable delays or time lags between cells, a phenomenon known as "jitter".

According to another characteristic of the invention, the generation of binary errors in the incident digital signal having a format and bit rate corresponding to the transmission standards of the network comprises the following steps:

recording one or more predetermined error generation models;

loading the desired model in read/write storage means so as to obtain an error generation digital signal by the reading of these storage means;

combining the error generation signal with the incident signal so as to introduce errors into the binary elements of this signal.

According to another characteristic of the invention, the generation of cell errors in the incident digital signal having a format and a bit rate corresponding to the transmission standards of an ATM network and comprising cells assigned to a communication, identifiable by their header, comprises the following steps:

recording one or more predermined models of errors;

loading the desired model into read/write storage means so as to obtain a error generation digital signal by the reading of these storage means;

generating erroneous cells;

replacing cells of the incident signal by erroneous signals as a function of the rate dictated by the error generation signal.

According to another characteristic of the invention, the generation of cell jitter in the incident cell transmitted in ATM mode comprises the following steps:

memorizing a pre-established set-value model of jitter, determining the time delay between the incident cells pertaining to one and the same communication;

modifying or not modifying the delay between cells of this same communication according to the set value.

The invention also relates to a simulator of transmission on an ATM transmission network wherein, chiefly, said simulator comprises connection means, means for the generation of a digital signal with a format and bit rate corresponding to the transmission standards of the network and control and processing means.

According to another characteristic of the invention, the connection means comprise means for the connection of the terminal to the network in reception mode and means for the connection of the network to the terminal in transmission mode.

According to another characteristic of the invention, the means of connection in reception mode are capable of receiving cells sent by a terminal A, these means comprising means to match the rate of arrival of these cells to that of the generated cells, multiplexing means to multiplex the cells received with the cells generated so as to obtain the signal with the required format and bit rate.

According to another characteristic of the invention, the means of connection in transmission mode comprise means for the identification of the cells so as to detect, in a generated digital signal, the cells intended for a terminal and means for the transmission of these cells to the terminal.

According to another characteristic of the invention, the processing and control means comprising means for the generation of errors on an incident signal, this signal being the generated digital signal or the signal obtained by multiplexing.

According to another characteristic, the error generation means comprise binary error generating means.

According to another characteristic, the error generation means comprise cell error generation means.

According to another characteristic, the error generation means comprise means for the generation of jitter or variable delays between cells.

The binary error generation means comprise:

first storage means in which there are recorded one or more predetermined models of error generation, second read/write storage means in which the desired model is loaded so as to obtain a digital signal of error generation by the reading of these second storage means, control means capable of controlling reading and writing operations in a second storage means, means for the combining of the incident signal and the error generation signal.

The cell error generation means comprise:

first storage means in which there are recorded one or more predetermined models of cell error generation;

second read/write storage means in which the desired model is loaded at the required moment so as to obtain a digital signal of error generation by the reading of these second storage means;

control means capable of controlling operations for the reading/writing of the second storage means;

cell error generation means receiving the digital signal of error generation and generating cell errors in the incident signal as a function of the digital signal received.

The jitter generation means comprise:

means for the storage of a previously established set value of jitter;

means to measure the time delay between cells relating to one and the same communication;

means for the routing of the incident cells depending on whether or not they relate to the same communication;

control means that can be used to modify or not modify the delay between cells relating to one and the same communication.

BRIEF DESCRIPTION OF THE DRAWINGS

Other particular features and advantages of the invention shall appear from the detailed description, that is given by way of a non-restrictive illustration with reference to the appended drawings, of which.

DETAILED DESCRIPTION OF THE PREFERRED EMBODIMENT

Figure 1:
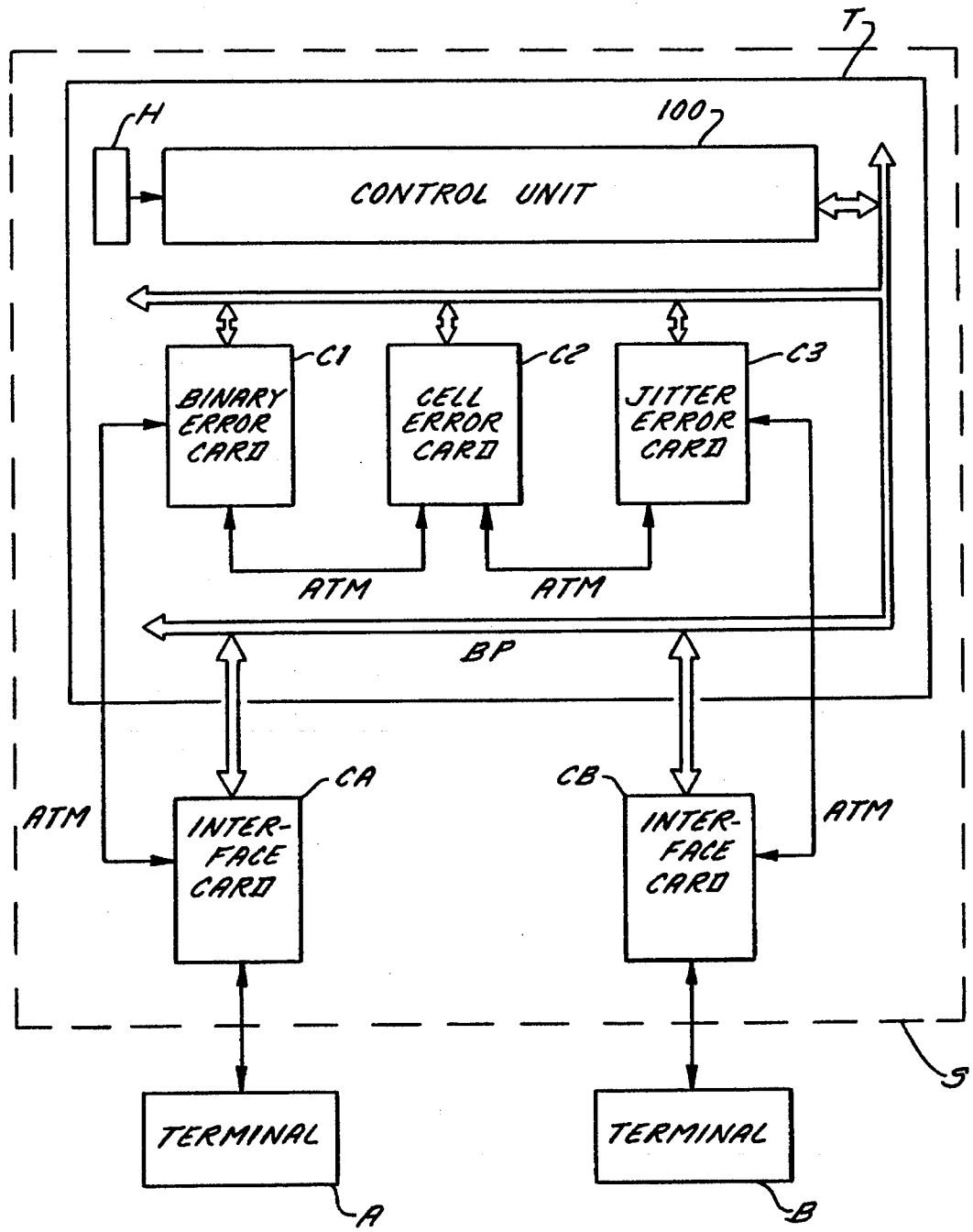
FIG. 1 shows a general diagram of the simulator according to the invention.

The simulator according to the invention, which shall be described functionally on the basis of the schematic diagram of FIG. 1 and in greater detail by means of all the other figures, comprises two distinct parts: 1) a connection part and 2) a processing part.

1)—CONNECTION

The connection part enables the connection to be made between a terminal A and the simulator S and between a terminal B and this simulator.

This connection part is formed by two interface sets that take the form of electronic cards CA and CB. Each interface enables access in both the directions indicated by the arrows, namely from the terminal A to the terminal B and, in reverse, from the terminal B to the terminal A.

2)—PROCESSING

The processing part T comprises chiefly a control unit or means 100 formed by a central processing and control unit CPU comprising a microprocessor provided with all its usual peripheral circuits, interfaces, RAMs and ROMs.

This processing part T furthermore comprises error generation cards formed by three electronic cards C1, C2, C3.

C1 designates the card that will enable the generation of binary errors, C2 the card that will enable the generation of cell errors and C3 the card that will enable the generation of jitter errors.

The cards are all connected to the unit 100 by a processor bus BP and they are also connected to one another by a bus type link corresponding to what shall hereinafter be called an ATM bus. This is the signal generated by the connection cards CA or CB which is multiplexed or not multiplexed with a signal received from one of the terminals A or B.

The ATM bus goes through each card, and it is quite possible that the information elements conveyed by it will not have undergone processing inside one or more error generation cards following a command for the deactivation of the circuits of these cards by the unit 100.

Thus the unit 100 is capable of giving a signal for the activation or deactivation of the circuits of each card C1, C2, C3 through the address, data and control bus BP. The information elements conveyed by the bus ATM are then transmitted to the next card without modification.

The cards are all synchronized at a clock frequency H of 19.44 MHz, giving a bit frequency for the bus ATM of 155.52 Hz given by a clock signal H to the unit 100.

CONNECTION

Reception-Transmission Line Interface/Rate Matching/Cell Generator

Figure 2:
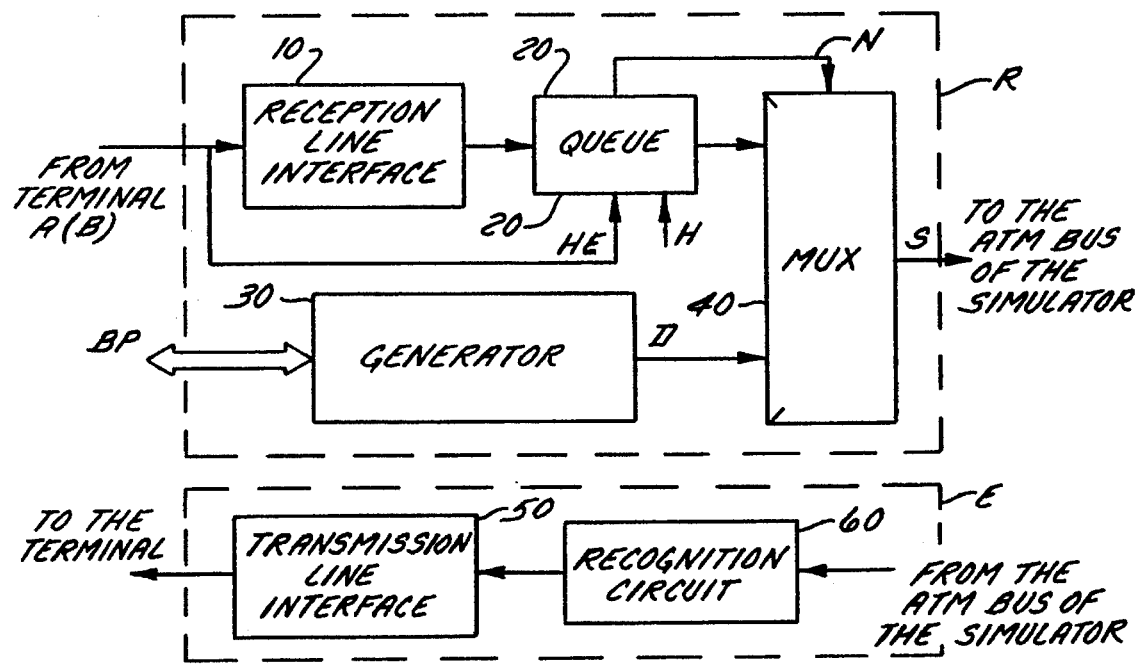
FIG. 2 shows a detailed diagram of the reception connection means R and the transmission connection means E.
Figure 3:
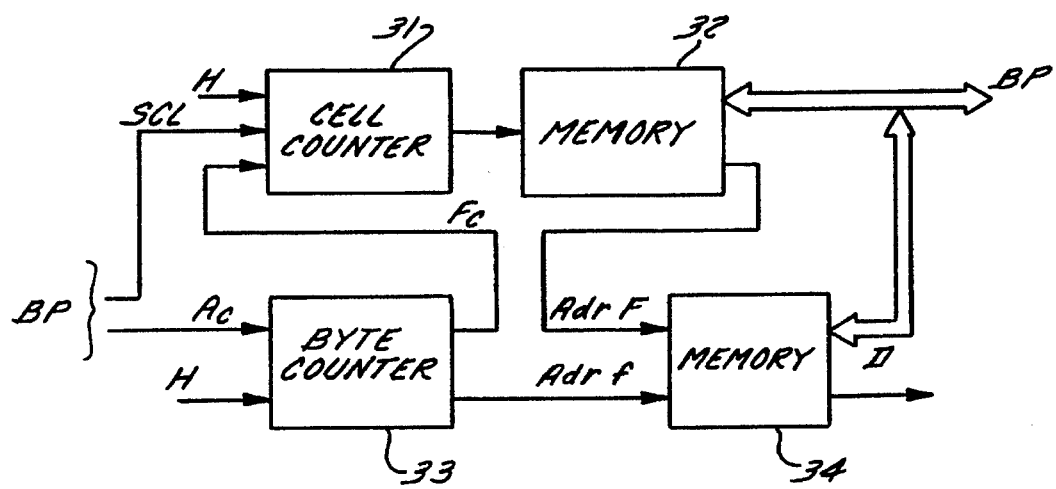
FIG. 3 shows a diagram of a practical embodiment of the cell generator according to FIG. 2.

FIG. 2 shows the details of an embodiment of a connection card CA or CB according to the invention.

The card has a part that shall hereinafter be called a reception part R to imply that it relates to the connection in the terminal-to-simulator direction.

The reception part R has a reception line interface 10 that enables a parallel link on eight wires for example, that is standard per se, followed by rate-matching device or queue 20 of the FIFO stack type to match the rate of the information cells received by the interface 10 and given by a terminal with that of the simulator. To this end, the writing in the stack is done at the rate of the internal clock signal H.

The part R also has a multiplexer 40 and a generator 30.

Should it be the case that there is no reception link between the simulator and a terminal, the outflow S from the reception part R is given solely by the generator 30. If not, the outflow results from a multiplexing between the cells generated by the generator and the cells available in the queue 20. As soon as a complete cell (53 bytes) is present in the queue 20, it is routed through the multiplexer upon a command by the signal N for the filling of the queue 20.

The transmission part E has a circuit 60 for the recognition of the headers of the cells that it receives from the ATM bus of the simulator and that are intended for the reception terminal.

Figure 6:
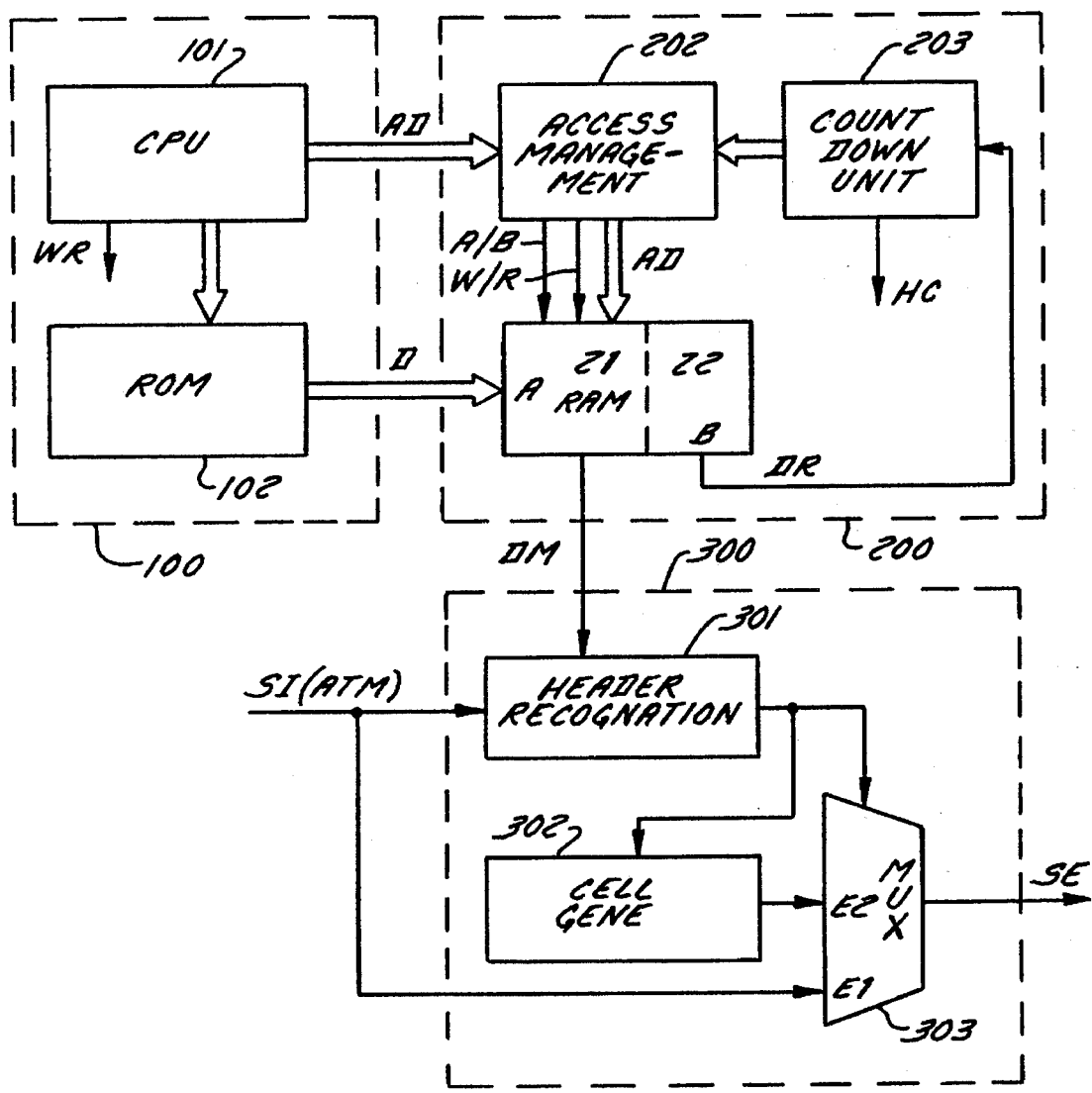
FIG. 6 shows a detailed diagram of an embodiment of the device of FIG. 5.

The circuit 60 is similar to the circuit 301 which shall be described in detail hereinafter in the description with reference to FIG. 6. A transmission line interface 50 receives the cells intended for the reception terminal and sends them to this terminal. The interface 50, which is standard per se, is capable of transmitting the cells byte by byte, in parallel on eight wires.

A detailed description shall now be given of a preferred exemplary embodiment for the cell generator 30. This generator 30 has means to store the cells to be generated. These means are programmed by the unit 100 so as to make it possible to obtain a sequence with a size of 32768 cells, it being possble to renew the sequence by recommencing the reading cycles.

Preferably, to minimize the memory size needed, two memories are used. One memory 34 memorizes the contents of the cells i.e. according to this example 128×53 bytes. The other memory 32 contains a set of numbers corresponding to numbers of cells that are to be generated from among the 128 cells memorized in the memory 34. The memory 32 corresponds to an index memory that makes it possible to have at least one sequence of 32768 cells.

The memories are controlled by a time base. The time base has a byte counter 33 that is a counter by 53 and that addresses the least significant bits Adrf of the contents of memory 34. This time base furthermore comprises a cell counter 31 that is a counter by 32768. This cell counter 31 is incremented at each cell by a signal Fc and addresses the most significant bits Adrf. This counter may or may not be turned off at a given address ADR by the loop command BCL of the bus BP. When it is off at an address, it is the same addressed cell that will be transmitted continually until the interruption of this signal. When the counter is not off, the cells are transmitted in the sequence programmed in the index memory 32.

The counter 31 is incremented by an output of the byte counter 33 which indicates the end of a cell Fc. The counter 33 is activated by a signal AC formed by the bus BP to start up a cell generation sequence.

PROCESSING

Binary Errors/Cell Errors/Jitter Errors

The following part of the description shall deal with the different error generation cards.

According to the invention, the unit 100 is programmed so that, by means of its address, data and control bus BP, it controls the different circuits as described with respect to the cards CA and CB and as shall be described with reference to the cards C1, C2, C3 and so that it thus implements the simulation method described.

Figure 4:
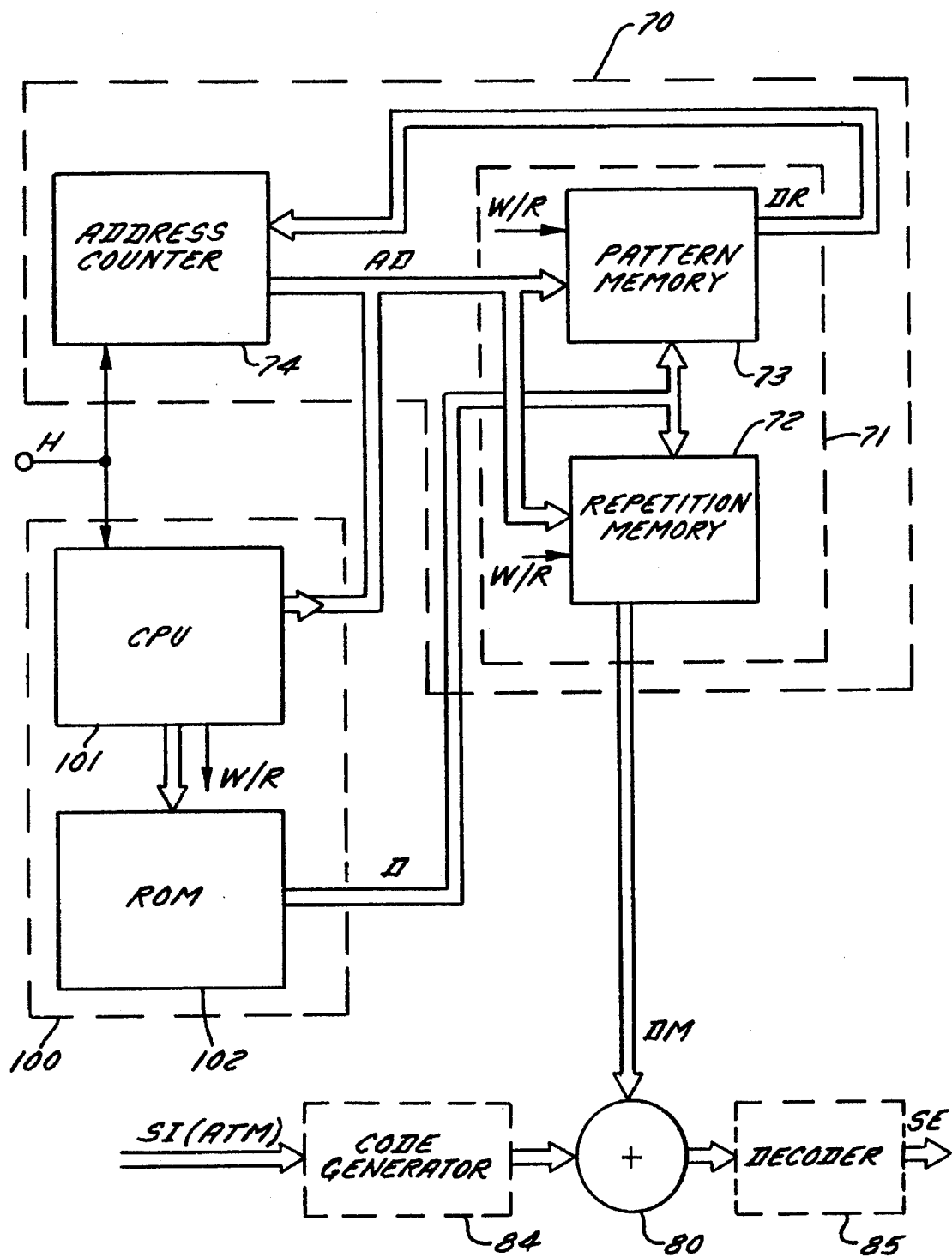
FIG. 4 shows a diagram of an embodiment of the binary error generation means.

FIG. 4 shows a drawing of an embodiment of binary error generation as embodied by the card C1. In practice, the sets 70, 80, 84 and 85 are duplicated to enable a simulation of two-way transmission. In practice also, the unit IO that controls the means 70 is the central processing unit shown in FIG. 1. This is why it bears the same reference number.

Figure 5:
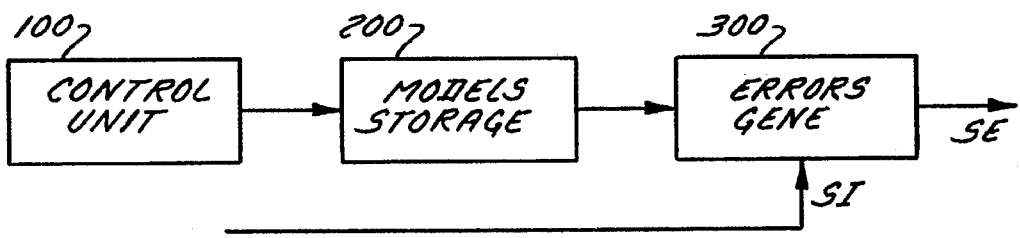
FIG. 5 shows a general diagram of an embodiment of the cell error generation means.

FIG. 5 (or 6) shows a diagram of an embodiment of cell error generation means as constituted by the card C2. In the same practical way and for the same reasons as those set out here above, the sets 200 and 300 are duplicated. In practice also, the unit for controlling the means 200 is the central processing unit shown in FIG. 1.

The incident signal in each card is called SI. It is the signal conveyed by the ATM bus shown in FIG. 1.

Binary Error Generator

FIG. 4 shows a drawing of an embodiment of the binary error generation device according to the invention. This device has storage means 70 controlled in reading and writing mode by the control unit 100 which more specifically comprises a central processing unit 101. This unit 101 is associated with program and data storage means 102 in order to obtain the generation of binary errors as shall be described hereinafter.

According to the invention, as a preliminary, one or more error generation models are recorded in these storage means.

Each model recorded is defined by a known mathematical law. In this respect, a law such as Poisson's law may be cited. The recorded models may also be the result of measurements made during real transmission on the different networks.

Thus there are models available pertaining to the transmission network. To carry out the generation of binary errors on the incident signal SI having a format and bit rate corresponding to that of transmission on a given network, the error model corresponding to transmission on this network is loaded into the storage means 70. The loading is done by the central processing unit which, for this purpose, activates the writing of the model in these storage means and then activates the reading of the recorded model at the rate of arrival of the data elements of the incident signal.

The data elements read in the storage means, at the rate of the incident signal SI, are combined so as to give a signal SE reproducing the transmission characteristics of the chosen network.

A signal SE such as this enables the simulation of a transmission on this network.

The combining of the two signals consists in reversing the binary elements of the incident signal SI when the binary elements of the error generation signal DM are active.

Indeed, the model loaded into the error generation storage means 70 take the form of binary elements that are in the logic state 0 or 1, depending on the convention adopted to obtain an error or no error in the incident signal.

According to the convention adopted in the practical embodiment, it has been chosen to memorize a 0 when no error has to be generated and to memorize a 1 when an error has to be generated.

It is recalled here that the error rate in transmission networks is generally low, in the range of $10^{-10}$. Even when an error rate of $10^{-6}$ which is considered to be excessive, is taken, it means that there are one million bits at zero in the memory, then one bit at one, and so on if the model is recurrent. The memory size required may thus be considerable.

Thus, preferably, to avoid having to use a very large-capacity memory for the storage of the model that will be read at the rate of the incident signal, a encoding that gives two types of information elements is used. To make it easier to understand the invention, these information elements have been shown by means of two distinct memory zones in FIG. 4. Naturally, these information elements may be on a single memory component.

The first type of information elements is constituted by words corresponding to patterns of errors and the other one by words corresponding to the distance between the errors. Thus, instead of storing an error pattern 0 or 1 corresponding to each bit of the incident train of bits, it has been chosen to encode the number of times that an error pattern will be repeated, the error pattern being equal to zero when there is no error according to the convention that has been chosen. Lengthy error-free sequences can thus be encoded with a much smaller number of bits.

As explained here above, the storage means 70 comprise a memory 71 comprising a pattern memory zone 72 and a repetition memory zone 73. These means furthermore comprise an address counter 74 designed for the addressing, in reading mode, of the memories 72 and 73 through the address bus AD.

According to one practical embodiment, the models take the form of a set of error patterns corresponding to eight-bit words. To each error pattern, there corresponds a 16-bit word that makes it possible to encode the number of times that the associated pattern must be repeated during the generation of errors.

A data bus D is used to load the error pattern memory 72 with data elements DM and the repetition memory 73 with data elements coming from the memory 102. For this purpose, the central processing unit gives a write command in these memories, by means of the command signal W/R. The addressing of the memories 72 and 73 during the writing is done by the central processing unit by means of the address bus AD.

By contrast, the addressing of the memories 72 and 73 for a reading operation is done by the counter 74 by means of the address bus AD, also upon a command by means of the signal W/R.

The counter 74 is controlled by the clock signal H corresponding to the rate of arrival of the data elements of the incident signal SI. At initialization, the counter is positioned at the first address of the memories 72 and 73, and is loaded with the value contained at the first address of the repetition memory 73. The counter remains at this address until the value loaded in this counter returns, by decrementation, to the initial position of the counter. The counter then passes to the next address.

Thus, the word stored at a given address in the memory 72 is repeated as many times as is indicated by the value stored in the memory 72 at the address at which the counter is positioned. The counter goes to the next address as soon as it is again in its initial position. The words DM read in the memory 72 are combined with the incident signal SI at the rate of arrival of this signal and make it possible to obtain a signal SE having the characteristics of a signal transmitted by a given transmission network.

The combining of the signal SI and the error patterns DM is obtained by an exclusive-OR type logic gate 80 that makes it possible to reverse bits of this signal when the error bits are active.

For example, to form the memories 72 and 73, if a memory component organized in 256 four-bit kwords is available, it means that there will be an error memory of 256 kwords of 24 bits, the repetition being encoded on 16 bits and the error patterns on 8 bits.

A configuration such as this can be used to attain a minimum error rate of $7.3 \ 10^{-12}$, giving a repetition cycle of about 15 minutes under optimal conditions, i.e. for only one error in the flow.

For a more complex error model, it is possible for example to envisage an error model with $10^{10}$ error-free bits, then four consecutive errors, then 100 correct bits, then $10^5$ bits with a mean error rate of $10^3$. A sequence such as this will occupy about 19300 words in a memory out of the 262144 available (256×1024 words). Without the encoding of the distance between two errors as has just been been described, such a model would take up about $1.5 \ 10^6$ memory bytes.

This device makes it possible to generate a sequence with a maximum size of $1.37 \ 10^{11}$ bits with a memory limited to $6.3 \ 10^6$ memory bits.

In this same figure, a line of dashes has been used to show an alternative embodiment of the device according to the invention. This variant makes it possible to approach transmission in ATM mode to the closest possible extent and consequently enables the best possible simulation of a transmission on an ATM network.

To this end, the device furthermore comprises means for the generation of an error correction code 84 placed upline with respect to the combination means 80, and they also comprise means 85 for the decoding of this error correction code, placed downline with respect to these means 80.

Thus, the error correction code generation means 84 will make it possible, by means of this code, to protect the bytes of the header of the cells of the incident signal with the ATM format as recommended by the ATM standard.

This code will consequently enable the correction of the errors that may be generated from the device on the header of the header of the cells.

To meet the ATM standard, this correction is made on only one error per header. When more than one error is detected by the means for decoding the error correction code, the cell is destroyed as recommended by the ATM standard.

The circuits used to generate the error correction code and to decode this error correction code are circuits that are commercially available.

An example of a practical structure would be, for example, an Xilinx circuit (3020PC68) to carry out the generation of the error correction code and an Xilinx circuit (3042PG132) to carry out the decoding of the error corrector code.

For example again, the storage means 10 could be constituted by a video RAM type of memory. The parallel data port is used by the central processing unit for access in writing mode and the serial port is used for access in reading mode only for the output of the data at the rate of the ATM bus.

Generation of Cell Errors

FIG. 5 is a schematic diagram of the cell error generation device according to the invention. This device is controlled by the unit 100. It comprises a programmable unit 200 for the storage of the desired model and a programmable unit 300 for the generation of error cells proper.

The incident signal in which error cells will be generated is received by the generator 300 and comprises cells assigned to a communication. These cells may be "empty" cells or data cells, these two types of cells being differentiated by their header.

Different models of errors have been recorded and stored on a preliminary basis in the unit 100. To generate errors in the incident signal, the model to be used is chosen and it is loaded in the storage unit 200.

This unit 200 makes a transmission, at the rate of arrival of the cells of the incident signal, of a digital signal informing the generator 300 whether or not a cell error has to be generated, and the nature of the error. The errors generated are of two types: either a loss of a cell or an insertion.

When there is a loss of cells, the communication concerned does not receive the information contained in the lost cell.

When there is a wrong insertion of a cell, the communication concerned receives data elements that are not intended for it.

Further details will be given here below on the method according to the invention, with reference to the drawing of a preferred embodiment of the device, shown in FIG. 6.

As stated earlier, models of cell errors have been recorded beforehand. These models have been obtained for example by a known mathematical law. An example of a law that may be cited is Poisson's law. The recorded models may also be the result of measurements made during real transmissions on networks.

There are thus different error models available that can be used to characterize a transmission on an ATM network.

To carry out the generation of cell errors on an incident signal SI with a format and bit rate corresponding to that of transmission on an ATM network, the error model chosen is loaded into the error memory 201.

This memory is a read/write programmable memory of the dynamic RAM type.

According to a preferred embodiment, in order to obtain data elements at the rate of the ATM bus for the output, this memory is a video RAM. A management circuit 202 has been associated with this video RAM to manage access to it in read/write mode. It is recalled, in this respect, that a video RAM has a parallel port and a serial port.

In this embodiment, the models have been recorded beforehand in a ROM type read memory 102 and are loaded into the memory 201 from the parallel port A of this memory.

The data elements thus memorized in this memory are read at the rate of the ATM bus and are accessible at output on its series port B.

The circuit 202 for access management and for the addressing of the memory 201 receives command signals for the addressing of the central processing unit 101, when the models are loaded, through the data bus D.

The memory 201 is loaded with error patterns that take the form of words indicating, firstly, the rate of appearance of the errors and, secondly, the nature of the errors.

In practice, thse words comprise a bit whose value indicates that it is necessary to generate a cell with or without error. This bit is equal, for example, to 0 to indicate that there is no error and 1 to indicate that there is an error. These words furthermore comprise a bit to indicate the nature of the error, i.e. to state whether it is an insertion or a loss of a cell.

To obtain an error rate of the order of $10^{-8}$ with a line bit rate of 155 Mbits/s, it is necessary to have an error memory with a capacity of ten megabytes.

To avoid having to use a memory capacity such as this, the method consists in encoding the error model in the form of patterns of errors with which there is associated a word indicating the number of times that the pattern must be repeated, this word being, consequently, the factor of repetition of the pattern.

Lengthy error-free sequences can thus be encoded with a far smaller number of bits.

Consequently, the error memory contains patterns corresponding to the "no error" information, with a factor of repetition of the pattern being associated with these patterns. The memory also contains patterns corresponding to the "error" information, with a factor of repetition of the pattern being associated with these patterns.

The repetition factors of the error-free patterns have a value that is far greater than the repetition factors of the patterns with errors. It will be understood that the encoding of the repetition factor must take account of this constraint.

According to a preferred exemplary embodiment, it has been chosen to encode the repetition factor on 14 bits so that these patterns can be repeated from once to 16384 times, which is an acceptable order of magnitude.

it

The error memory 201 consequently makes possible to obtain, at output, the error patterns DM which are applied to an input of the error circuit 300, as well as the repetition factor DR that is read with the associated error pattern and that is applied to the input of a countdown unit 203. To simplify the explanation, it can be said that these patterns DM are memorized in a zone Z1 of the memory and that the patterns DR are memorized in a zone Z2 of this memory.

The countdown unit 203 is controlled by an external clock Hc corresponding to the rate at which the cells of the incident signal SI arrive.

At initialization, the counter is at a value that enables it to obtain the first address of the memory 201 and to remain at this address until the value loaded into this counter returns to the initial position.

The countdown unit 203 goes to the next address as soon as it recovers its initial value.

The error generation proper will be specified hereinafter.

The models that have been set up make it possible to determine the instant at which an error should be generated in the incident signal and the nature of the error (loss or insertion of a cell). The error circuit 300 makes it possible to act on the incident cells of the ATM bus to insert the errors therein when the model indicates it.

To this end, the circuit 300 includes a header recognition circuit 301, a circuit for the generation of replacement cells 302 and a multiplexer 303.

The circuit 301 filters the headers of cells to be affected. The circuit 302 generates a defect on the cells filtered by the circuit 301. The defect consists in modifying the header of the filtered cells.

The ATM bus conveys information cells. Should there be no information to be conveyed, special cells called empty cells, identified by their header, are used.

The circuits 301 and 302 comprise storage means in which the header of an empty cell and the header of the communication to be affected are stored.

To generate losses of cells, the circuit 301 filters the header of the communication to be affected, and the generator circuit 302 introduces the header of an empty cell into this cell. Thus a valid cell is replaced by an empty cell, which amounts to a loss of cell for the affected communication.

To generate a cell insertion, the circuit 301 filters the header of an empty cell and the circuit 302 replaces this header with that of the communication to be affected. In this case, the circuit 302 replaces an empty cell with a valid cell. However, the information contained in the cell remains that of the original empty cell.

The multiplexer 303 enables the selection, at output, of either an incident cell present at the input E1 or a generated cell present at the input E2.

The output of the multiplexer gives the ATM signal in which the cell errors have been generated.

For example, in a practical embodiment of the invention, a video RAM was used for the memory 201, and a Xilinx programmable circuit was used to carry out the functions of the circuits 202 and 203. Two other Xilinx programmable circuits were also used to carry out the functions of the circuits 301 and 302.

Jitter Generation

In a communication in ATM mode, cells whose identity is known are sent from a terminal to one or more other terminals, and possibly cells are received from the terminal or terminals, this procedure taking place after a signalling exchange. This communication is done through a network formed by one or more switching nodes, proper to the ATM, that can get saturated. This is why there is provision for queues at each node.

The time taken by a cell to go through the network varies as a function of the number of nodes crossed and the load of these nodes. This variation of the time taken to cross the network results in a delay between the cells at arrival that is different from the original delay. This is what is understood by jitter. Hereinafter the terms "cell jitter" or "jittered cells" shall be used.

In ATM mode, a terminal connected to the network experiences the arrival of a flow of cells on the ATM network to which it is connected, coming from one or more transmission sources. This flow is constituted notably by cells intended for this terminal. The terminal is capable of selecting the cells intended for it by reading their headers. These cells shall hereinafter be called cells relating to one and the same communication.

The jitter therefore has the effect of modifying the temporal distribution of the cells transmitted at the time of departure from a transmission terminal. On arrival in the reception terminal, the order of the cells is maintained but it no longer has the same distribution. The jitter induces, for example, a burst of cells relating to the reception terminal followed by a number X of foreign cells intended for other terminals.

The jitter affects the sizing of the ATM terminals.

Figure 7:
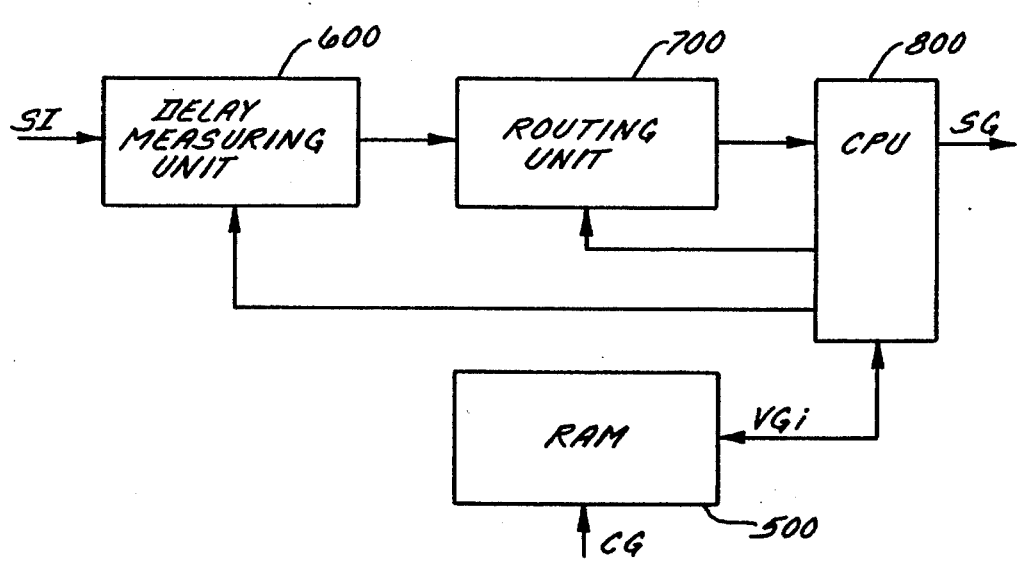
FIG. 7 shows a general diagram of an embodiment of the jitter generation means.

FIG. 7 shows a schematic diagram of the device for the generation of cell jitter according to the invention.

Throughout the rest of this description, the term used will be jittered cells which will be referenced G for the cells relating to one and the same communication. The cells G will consequently be the cells of the communication that are affected by the jitter introduced according to the invention. The other cells will be referenced NG to indicate that they are cells belonging to communications that are unaffected by jitter.

The device comprises a storage unit 500 that makes it possible to program a set value of jitter CG established beforehand on the basis either of measurements made on an ATM transmission link or on the basis of a given mathematical law that most efficiently reflects the phenomenon of jitter in an ATM transmission.

A control unit 800 is designed to command the reading of the set value in the unit 500 and to command the generation of a signal SG without or without variable delays between cells according to the signal of the set value.

The outflow SG from the device is identical to the inflow SI when the delay between cells remains the same at input as at output. The outflow is different when the delay between cells has been modified with respect to the delay at the inflow.

The delay between cells in the inflow SI is measured by a unit 600.

After the measurement of this delay, the cells G relating to the communication concerned are separated from the other cells NG. This separation or routing is done by the unit 700.

The control unit 800 makes it possible to control all the operations carried out by the units 500, 600 and 700 in order to then modify the delay between cells of the communication concerned by reinserting the same number of cells NG (other communications) or a different number of cells NG between two cells G.

Figure 8:
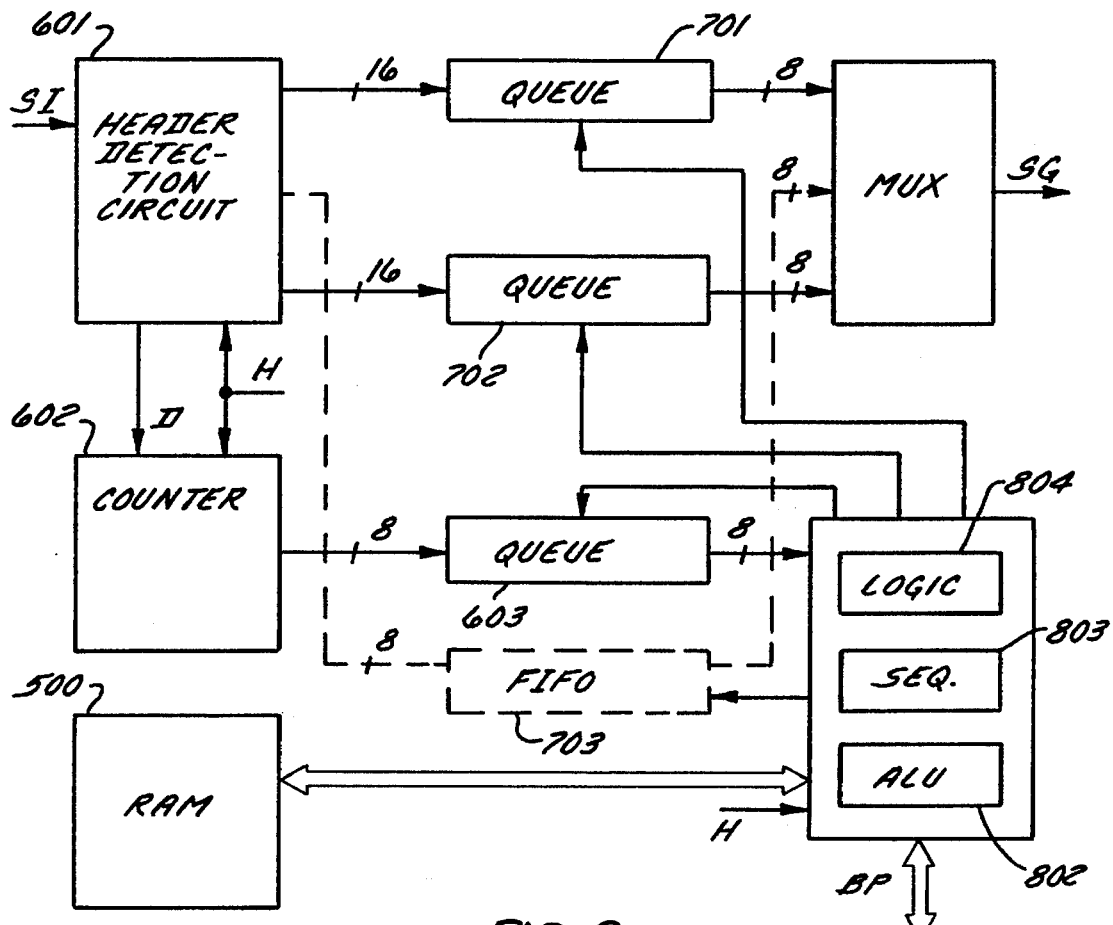
FIG. 8 shows a more detailed diagram of an embodiment of the device of FIG. 7.

A non-restrictive exemplary embodiment shall be described here below with reference to FIG. 8. According to this example, the unit 500 is formed by a RAM type read/write memory. This memory is therefore loaded with a desired and modifiable set value model CG. The unit 600 is formed by a circuit 601 for the detection of the headers of the cells enabling the identification of the cells G pertaining to the communication concerned and the other cells NG.

Associated with this circuit 601, this unit 600 also includes a circuit 602 for counting the cell delay and a queue 603 formed by FIFO type storage stacks, in order to store the values of delay obtained at the output of the counter 602.

The routing unit 700, according to this embodiment, comprises a queue 701 formed by FIFO stack type storage stacks, enabling the storage of the cells G relating to the communication affected, identified by the circuit 601.

This unit 700 also has a queue 702, formed by FIFO stack type storage stacks used to store the cells NG of other communications.

The control unit 800 makes it possible to generate jitter, according to the steps that shall be described hereinafter, on being commanded by the unit 100. For this purpose, the unit 800 has a multiplexer 805, an arithmetic and logic unit 802, a sequencer 803 and a control logic 804 so as to manage the addressing of the storage stacks, the counting of delays and the insertion or the carry-over of cells between the cells of the communication affected by jitter.

The progress of all the operations controlled by the central processing unit by means of the arithmetic and logic unit 802, the sequencer 803 and the control logic 804 to obtain a jitter cycle is illustrated by the flow chart of FIG. 1.

All these sets are synchronized with the clock signal H, centered on the header of the cells and corresponding to the rate of arrival of the cells.

The header detector 601 is synchronized with the clock signal H corresponding to the rate of arrival of the cells. This circuit is formed, for example, by a programmable circuit Xilinx in which the header of the cells of the affected communication has been programmed. This circuit compares the headers of the incident cells, at the rate of their arrival, with the programmed header and transmits the cell to the set 701 or 702 depending on the results of the comparison.

The counter 602 is activated by a signal D for the detection of cells delivered by the circuit 601.

Figure 9:
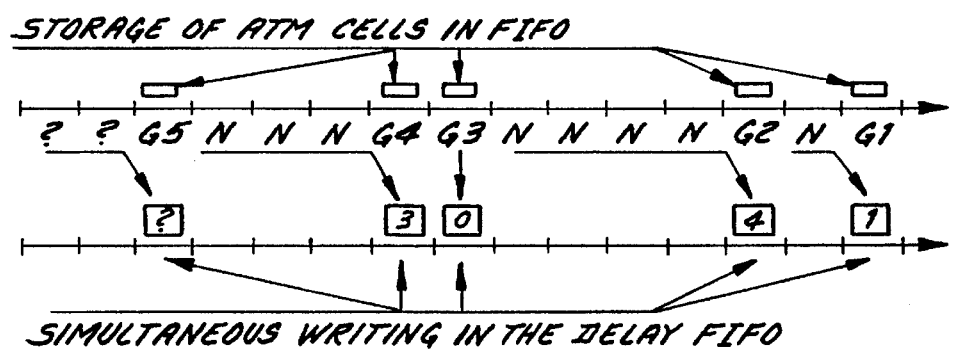
FIG. 9 shows a diagram illustrating the storage of the cells and the counting.

The storage of the cells in the FIFO stack 701 is done simultaneously with the storage in the stack 603 of the measured delay associated with each cell as illustrated by the example given in the diagram of FIG. 9.

In this diagram, the delay between the cells G1 and G2 is equal to 1, this value of delay "1" is assigned to the cell G1. The delay between G2 and G3 is 4, 4 is assigned to the cell G3. The delay between G3 and G4 is 0, 0 is assigned to G3.

The programmed set value therefore implies the storing of the words indicating the values of delay that are governed by a given programming relationship.

To obtain one cell more between two cells G, the set value will be equal to +1. To obtain one cell less, the set value will be equal to −1.

To obtain no change, the set value will be equal to 0.

The sequencing unit controls the reading of a set value $VG_i$ then $VG_{i+1}$ to implement the cycle for the generation of jitter on the cell $G_i$ then $G_{i+1}$.

Thus, to jitter the cells G, the device will insert a variable number of cells NG between two cells G.

Hereinafter, the following designations are used:

VG: jitter value (or set value)

ECART: the delay beween two cells G; it therefore represents the number of non-jittered cells in the inflow.

DELTA: the remainder of jitter to be ended on the next cell should it be be impossible to carry out the computation;

nNG: the number of non-jittered cells NG to be sent before producing the jittered cell G that is the object of the computation.

The arithmetical unit carries out the following computation:

$$nNG = ECART + VG + DELTA$$

the value DELTA represents a carry-over in the computation when nNG is negative.

According to an example of a practical embodiment, the maximum value of the parameter ECART is fixed at 4095 (cells).

To process a cell $G_i$, the parameters ECART and $VG_i$ relating to this cell as well as the parameter DELTA resulting from the foregoing computation are read.

If nNG>0, the jitter is positive, the cycle for the cell can begin. The control means sequence the output with a number of cells NG corresponding to the number nNG and then the output of the cell $G_i$.

If nNG<0, there is impossibility. DELTA is then forced to the value nNG and the cell $G_i$ is sent immediately.

To avoid having to read an empty stack, there is provision for carrying out a test on the stack of cells NG in the loop for emptying the number nNG of cells. This test will take place immediately after the sending of a cell NG. Should the stack NG be empty, the jittered cell is sent "in advance" and the number of cells NG remaining to be put out is carried over to the value DELTA.

Figure 10:
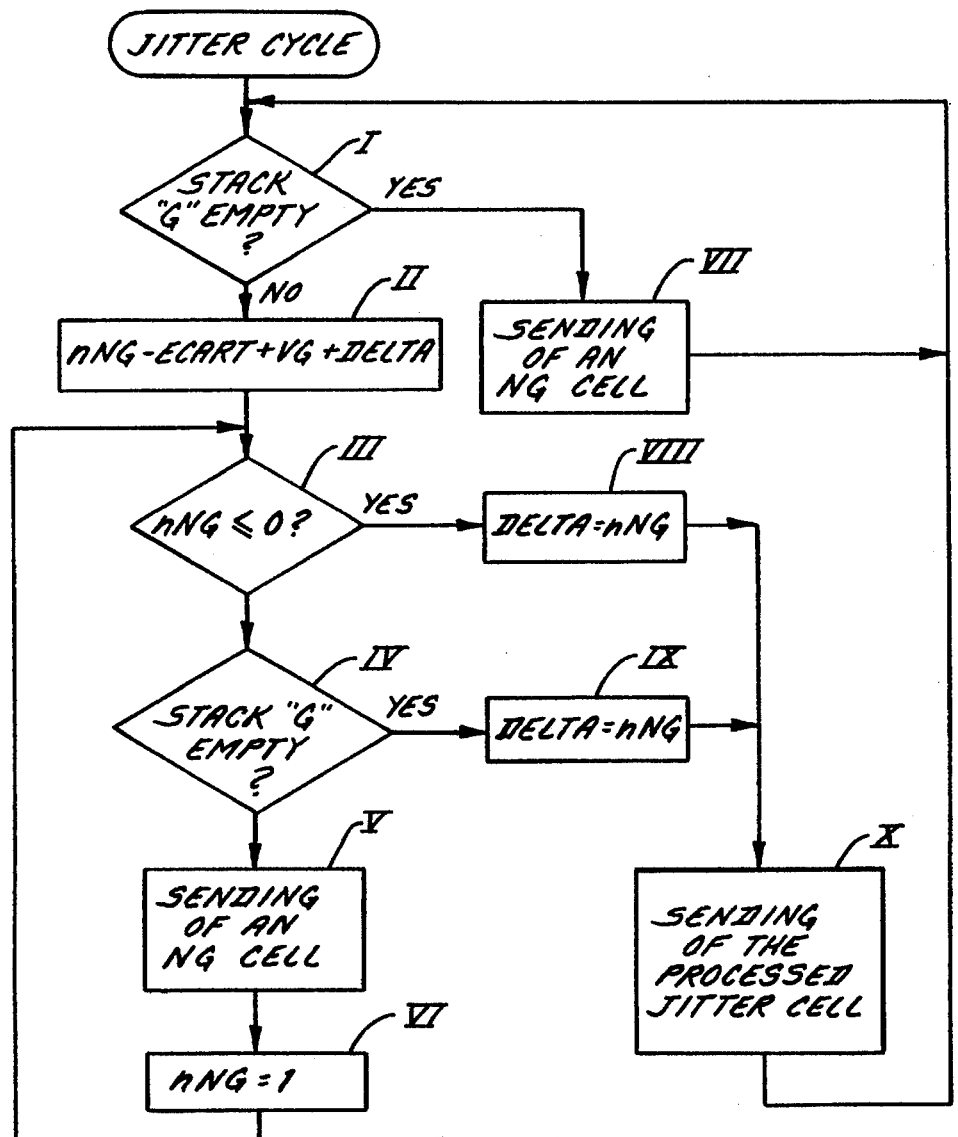
FIG. 10 is a flow chart of the jitter generation in an exemplary practical embodiment.

All the steps I to X mentioned in FIG. 10 correspond to the different operations carried out for a jitter cycle that has just been described in detail.

Details of a practical embodiment shall now be given by way of an example.

A 32k×16 static RAM has been chosen for the circuit 500, making it possible to memorize values on 16 bits, that is +32767 to −32768. The cycle recommences in a way identical to itself every 32768 jittered cells.

The arithmetic and logic unit 802 works on 16 units and, with the sequencer 803, forms a unit for the sequencing of the operations in synchronism with the signal H.

The functions of the units 601 and 602 are integrated into a FPGA (Field Programmable Gate Array) type of logic circuit.

The storage stacks 701, 702 have a capacity of 256k×8, for the maximum delay between two cells G has been fixed at a value equal to 4096 cells. Each stack should have a size of at least 53×4096 bytes.

To have this capacity, the stacks are constituted by static RAMs associated with a logic 804 that is standard per se and that is used to manage the reading and writing operations.

It is possible to write a byte in these stacks at the rate of the base clock and simultaneously to read a byte. Since the access time for present-day memories is limited, the following structure has been chosen for reading and writing:

Indeed, the odd-parity length of an ATM cell hampers the management of bytes by pairs at a rate of 155 Mbit/s. For the speedier management of memory write operations, the usual procedure is to work with pairs of values. For example, if it is sought to store 8-bit bytes in the memory at speeds approaching the limit of the access time for these memories, then it is enough to place two bytes in parallel in 16-bit memories. The operation then takes place at a rate that is twice as slow. However, this is impossible in this embodiment.

Thus, to resolve this problem, an odd-parity flow of bytes is considered. This flow is divided into three different flows:

the flow of the even-parity bytes in which the 0, 2, . . . , 2i, . . . , etc. order bytes are stored, the flow of the odd-parity bytes comprising the bytes 1, 3, 5, 2 i+1, etc, the flow of the last bytes (DER).

This breakdown can be used to obtain two flows (even-parity and odd-parity), having an identical number elements. Furthermore, this number is an even number. The last byte of each sequence is stored in a FIFO type stack referenced 701. In this way, it is possible to manage read/write operations by pairs and process the last one in a single cycle with a FIFO stack having a determined capacity but with very fast access time. The capacity of the FIFO depends on the number of bytes to be stored at the same time in the RAM. If this RAM has 2 kbytes and if the odd-parity sequence is equal to (2N+1) bytes, the FIFO must have a capacity of $$\frac{2k-1}{N}$$

words of 16 bits

The even-parity and odd-parity bytes 0 and 1 are described at the same time and then, in turn, the bytes 2 and 3 etc. When the last byte arrives, it is written in the FIFO 703 (DER) reserved for the last byte of each sequence.

For the reading, the same principle is adopted.

Thus, a simple system has been made, making it possible to write and then immediately read odd-parity bytes by pairs. This furthermore enables the use of the indicator of the empty queue of this FIFO stack as a general indicator for this storage unit.

What is claimed is:

1. A method for the simulation of transmission on an asynchronous transfer mode transmission network, comprising:

simulating the asynchronous transfer mode network, the simulating step further comprising the step of connecting a reception terminal to a simulator, said reception terminal being capable of receiving signals constituted of cells according to the asynchronous transfer mode format, generating a digital signal with a format and bit rate corresponding to a format and a bit rate which are standard for transmissions on the network, the generated digital signal being constituted by cells identifiable by a header, generating a signal representative of a simulated transmission error, forming a processed signal by introducing the error into an incident signal, wherein said incident signal comprises one of (A) the generated digital signal and (B) a multiplexed signal formed by multiplexing the generated digital signal with a signal received from a transmission terminal, and transmitting the processed signal to the reception terminal.

2. A method of simulation according to claim 1, wherein the simulation of the connection to the network by the terminal comprises, at reception:

matching the rate of arrival of cells coming from the terminal to the rate of the generated cells;

multiplexing the cells received from the generated cells to obtain the digital signal with a format and bit rate corresponding to the standard format and bit rate of the network.

3. A method of simulation according to claim 1, wherein the simulation of the connection to the network by the terminal comprises at transmission:

identifying, in the generated digital signal, cells intended for transmission to a second transmission/reception terminal;

transmitting the identified cells to the second terminal at the rate of reception by the second terminal.

4. A method of simulation according to claim 1 comprising simulating the transmission in both directions of transmission, from a first transmission reception terminal A towards a second transmission reception terminal B and in the reverse direction.

5. A method of simulation according to claim 1, wherein the simulated error signal generation comprises generating at least one of binary error signals, cell error signals and jitter signals.

6. A method of simulation according to claim 1, further comprising transmitting the processed signal to a second transmission/reception terminal when the processed signal is formed by introducing the error signal into the generated digital signal.

7. A method for the simulation of transmission on an asynchronous transfer mode transmission network, comprising:

simulating the asynchronous transfer mode network, the simulating step further comprising the step of connecting a reception terminal to a simulator, said reception terminal being capable of receiving signals constituted of cells according to the asynchronous transfer mode format;

generating a digital signal with a format and bit rate corresponding to a format and a bit rate which are standard for transmissions on the network, the generated digital signal being constituted by cells identifiable by a header;

generating a signal representative of a simulated transmission error, the simulated error signal being a binary error signal, wherein the generation of binary error signals further comprises recording at least one predetermined error generation model, and loading the model in read/write storage means so as to obtain a digital error generation signal by the reading of the storage means;

forming a processed signal by introducing the error generation signal into an incident signal, wherein said incident signal comprises one of (A) the generated digital signal and (B) a multiplexed signal formed by multiplexing the generated digital signal with a signal received from a transmission terminal, thereby introducing errors into binary elements of the incident signal; and transmitting the processed signal to the reception terminal.

8. A method of simulation according to claim 7, wherein the combining of the signals comprises reversing the binary elements of the incident signal by binary elements of the error generation signal.

9. A method of simulation according to claim 7, wherein the model is predetermined on the basis of at least one of mathematical laws and measurements made during a transmission on the network.

10. A method of simulation according to claim 7, wherein the error generation digital signal is constituted by words corresponding to error patterns, and wherein the loading in the storage means comprises loading these patterns and loading the number of times that each pattern should be repeated, the reading operation comprising reading each pattern successively as many times as is indicated by the number stored for this pattern.

11. A method of simulation according to claim 7, wherein the patterns are 8-bit words and wherein the number of times that a byte must be repeated is encoded on 16 bits.

12. A method of simulation according to claim 7, further comprising carrying out an error correction encoding operation on the incident signal before making the combination with the error generation signal to correct transmission error on the headers of cells and carrying out an error correction decoding operation on the signal obtained after the combination to detect errors which have not been corrected by the error correction encoding operation.

13. A method for the simulation of transmission on an asynchronous transfer mode transmission network, comprising:

simulating the asynchronous transfer mode network, the simulating step further comprising the step of connecting a reception terminal to a simulator, said reception terminal being capable of receiving signals constituted of cells according to the asynchronous transfer mode format;

generating a digital signal with a format and bit rate corresponding to a format and a bit rate which are standard for transmissions on the network, the generated digital signal being constituted by cells identifiable by a header;

generating a signal representative of a simulated transmission error, the simulated error signal being a cell error signal wherein the generation of cell error signals further comprises recording at least one predetermined model of errors, loading the model into read/write storage means so as to obtain a digital error generation signal by the reading of these storage means, and generating erroneous cells;

forming a processed signal by introducing the error signal into an incident signal, wherein said incident signal comprises one of (A) the generated digital signal and (B) a multiplexed signal formed by multiplexing the generated digital signal with a signal received from a transmission terminal, the forming step further comprising the step of replacing cells of the incident signal by erroneous signals as a function of the rate dictated by the error generation signal; and transmitting the processed signal to the reception terminal.

14. A method of simulation according to claim 13, wherein the error generation digital signal is constituted by words corresponding to patterns expressing the rate of appearance of the errors and the nature of the error to be generated.

15. A method of simulation according to claim 14, wherein the loading into the storage means comprises changing the patterns and loading, in association with each pattern, a word for encoding the distance between the patterns so as to obtain a repetition factor for each pattern, the operation of reading the pattern then comprising successively reading the pattern successively as many times as is indicated by the factor for this pattern.

16. A method of simulation according to claim 15, wherein each pattern comprises (1) a bit whose value expresses one of the appearance of an erroneous cell and the appearance of an error-free cell and (2) a bit whose value expresses one of a loss and an insertion of a cell.

17. A method of simulation according to claim 13, wherein the generation of erroneous cells comprises one of:

storing the headers identifying an empty cell and a cell of the affected communication;

inserting the header of an empty cell in an incident valid cell in order to obtain a loss of cell; and inserting the header of a cell of the communication into an incident empty cell in order to obtain an insertion of a cell.

18. A method of simulation according to claim 13, wherein the model is predetermined on the basis of one of mathematical laws and measurements made on a real transmission on said network.

19. A method for the simulation of transmission on an asynchronous transfer mode transmission network, comprising:

generating a digital signal with a format and bit rate corresponding to a format and a bit rate which are standard for transmissions on the network, the generated digital signal being constituted by cells identifiable by a header;

generating a digital signal with a format and bit rate corresponding to a format and a bit rate which are standard for transmissions on the network, the generated digital signal being constituted by cells identifiable by a header;

generating a signal representative of a simulated transmission error, the simulated error signal being cell jitter, wherein the generation of cell jitter further comprises memorizing a pre-established set-value model of jitter, and determining a delay between incident cells of an incident signal pertaining to one and the same communication; and forming a processed signal by introducing the error signal into the incident signal, wherein said incident signal comprises one of (A) the generated digital signal and (B) a multiplexed signal formed by multiplexing the generated digital signal with a signal received from a transmission terminal, the forming step further comprising the step of modifying as necessary the delay between cells of this same communication according to the set value; and transmitting the processed signal to the reception terminal.

20. A method of simulation according to claim 19, wherein the modification comprises at least one of removing and inserting a number of cells given by the set value between the cells of one and the same communication.

21. A method of simulation according to claim 19, wherein the determining of the delay between cells comprises:

identifying the cell by its header;

counting, after identification, the number of cells between two cells relating to one and the same communication.

22. A method of simulation according to claim 21, wherein the identification of a cell comprises:

making a preliminary recording of the header of a cell relating to the communication affected by the jitter;

comparing the headers of the incident cells with this header;

storing, after counting, the delay between the cells so as to modify the delay as necessary depending on the set value.

23. A simulator of transmission on an asynchronous transfer mode transmission network, comprising:

connection means for connecting a reception terminal to the simulator, said reception terminal being capable of receiving signals constituted by cells according to the asynchronous transfer mode, means for generating a digital signal with a format and bit rate corresponding to a format and a bit rate which are standard for transmissions on the network, the generated digital signal being constituted by cells identifiable by a header, means for generating a signal representative of a simulated transmission error, and control and processing means for forming a processed signal by introducing the error signal into an incident signal, wherein said incident signal comprises one of (A) the generated digital signal and (B) a multiplexed signal formed by multiplexing the generated digital signal with a signal received from a transmission terminal.

24. A simulator according to claim 23, wherein the connection means comprise means for the connection of the terminal to the network in reception mode and means for the connection of the network to the terminal in transmission mode.

25. A simulator according to claim 23, wherein the means for connection in reception mode are capable of receiving cells sent by a first terminal and comprise a reception line interface, means for matching the rate of arrival of these cells with that of the generated cells, and multiplexing means for multiplexing the cells received with the cells generated so as to obtain the signal with the standard format and bit rate.

26. A simulator according to claim 24, wherein the means for connection in transmission mode comprise (1) means for the identification of the cells so as to detect, in a generated digital signal, the cells intended for a terminal and (2) a transmission line interface to transmit these cells to the terminal.

27. A simulator according to claim 23, wherein the error generation means comprise binary error generating means for generating binary errors.

28. A simulator according to claim 23, wherein the error generation means comprise cell error generation means for generating cell errors.

29. A simulator according to claim 23, wherein the error generation means comprise means for generating jitter.

30. A simulator according to claim 23, further comprising means for transmitting the processed signal to a second transmission/reception terminal when the processed signal is formed by introducing the error signal into the generated digital signal.

31. A simulator of transmission on an asynchronous transfer mode transmission network, comprising:

connection means for connecting a reception terminal to the simulator, said reception terminal being capable of receiving signals constituted by cells according to the asynchronous transfer mode, means for generating a digital signal with a format and bit rate corresponding to a format and a bit rate which are standard for transmissions on the network, the generated digital signal being constituted by cells identifiable by a header;

means for generating a signal representative of a simulated transmission error, the error generation means comprising binary error generating means for generating binary errors; the binary error generation means further comprising a first storage device in which there is recorded at least one predetermined model of error generation, a second read/write storage device in which the predetermined model is loaded so as to obtain a digital error generation signal by reading the second storage device, control means for controlling reading and writing operations in the second storage device; and control and processing means for forming a processed signal by introducing the error signal into an incident signal, wherein said incident signal comprises one of (A) the generated digital signal and (B) a multiplexed signal formed by multiplexing the generated digital signal with a signal received from a transmission terminal.

32. A simulator according to claim 31, wherein the second storage device comprise first and second memory zones, wherein the error signal is constituted by words corresponding to error patterns, the error patterns being loaded into the first memory zone, the second memory zone comprising words corresponding to the number of times that one and the same pattern must be read successively, and wherein the second storage device further comprises an address counter that makes it possible to address the memories, the address counter being incremented after the cycle number contained in the second memory zone is reached.

33. A simulator according to claim 31, further comprising an error correction encoding device to correct transmission error on the headers of cells, said error correction encoding device being placed upline with respect to the combining means, and an error correction decoding means to detect errors which have not been corrected by the error correction encoding operation, said error correction decoding means being placed downline with respect to the combining means.

34. A simulator according to claim 31, wherein the combining means includes an Exclusive-OR logic gate.

35. A simulator of transmission on an asynchronous transfer mode transmission network, comprising:

connection means for connecting a reception terminal to the simulator, said reception terminal being capable of receiving signals constituted by cells according to the asynchronous transfer mode, means for generating a digital signal with a format and bit rate corresponding to a format and a bit rate which are standard for transmissions on the network, the generated digital signal being constituted by cells identifiable by a header;

means for generating a signal representative of a simulated transmission error, the error generation means comprising cell error generation means for generating cell errors, the cell error generation means further comprising a first storage device in which there is recorded at least one predetermined model of cell error generation, a second read/write storage device in which the predetermined model is loaded at the required moment so as to obtain a digital error generation signal by reading the second storage device, control means for controlling operations for the reading/writing of the second storage device; and control and processing means for forming a processed signal by introducing the error signal into an incident signal, wherein said incident signal comprises one of (A) the generated digital signal and (B) a multiplexed signal formed by multiplexing the generated digital signal with a signal received from a transmission terminal, said control and processing means further comprising cell error generation means for receiving the error generation signal and for generating cell errors in the incident signal as a function of the received digital signal.

36. A simulator according to 35, wherein the cell error generation means comprise a header recognition device, means for generating a replacement cell, and multiplexing means for making it possible, upon the command of the header recognition device, to replace an incident cell with a replacement cell.

37. A simulator according to claim 35, wherein the second storage device comprises a memory having first and second memory zones, the error generation signal is constituted by words corresponding to error patterns, these patterns being loaded into the first memory zone, the second memory zone comprising words corresponding to the number of times that each pattern must be read successively, the second storage device further comprising an address countdown unit that makes it possible to address the memories, this countdown unit being initialized by the output of the second memory zone, the second storage device also comprising means for the management of access to the memory.

38. A simulator according to claim 37, wherein the memory is constituted by a dynamic RAM.

39. A simulator according to claim 37, wherein the memory is a video RAM.

40. A simulator of transmission on an asynchronous transfer mode transmission network, comprising:

connection means for connecting a reception terminal to the simulator, said reception terminal being capable of receiving signals constituted by cells according to the asynchronous transfer mode;

means for generating a digital signal with a format and bit rate corresponding to a format and a bit rate which are standard for transmissions on the network, the generated digital signal being constituted by cells identifiable by a header;

means for generating a signal representative of a simulated transmission error, the generating means comprising means for the generation of jitter, the jitter generation means further comprising means for storing a set value of jitter established beforehand, means for measuring the delay between cells relating to one and the same communication, means for routing incident cells of an incident signal depending on whether or not they relate to the same communication; and control and processing means for forming a processed signal by introducing the error signal into the incident signal, wherein said incident signal comprises one of (A) the generated digital signal and (B) a multiplexed signal formed by multiplexing the generated digital signal with a signal received from a transmission terminal, the control and processing means further comprising control means for modifying as necessary the delay between the cells relating to one and the same communication.

41. A simulator according claim 40, wherein the delay measurement means comprise:

a cell header detector;

a counter of delay between cells; and a storage register to store the value of this delay.

42. A simulator according to claim 40, wherein the routing means comprise a first register for the storage of cells relating to the same communication and a second register for the storage of other cells.

43. A simulator according to claim 40, comprising a register for the storage of the delay between cells relating to the same communication.

44. A simulator according to claim 40, wherein the routing means further comprise a storage register enabling the writing and reading of bytes by pairs, the last byte of each register being stored in the cell.

45. A simulator according to claim 40, wherien the control means comprise an arithmetic unit, a sequencer and a logic circuit for addressing the registers.

46. A simulator according to claim 40, wherein the storage means comprise a static RAM read/write memory.

47. A simulator according to claim 40, wherein the storage means are formed by static RAMs.

48. A method of simulation comprising:

simulating a connection of a transmission/reception terminal to an asynchronous transfer mode transmission network transmissions on which have a standard format and a standard bit rate, generating a digital signal which has a format and bit rate corresponding to the standards, generating a signal representative of a simulated transmission error which comprises one of a binary error, a cell error, and a jitter phenomenon, and forming a processed signal by introducing the error signal into an incident signal, wherein said incident signal comprises one of (A) the generated digital signal and (B) a multiplexed signal formed by multiplexing the generated digital signal with a signal received from the terminal.

49. A method of simulation according to claim 48, further comprising transmitting the processed signal to a second transmission/reception terminal when the processed signal is formed by introducing the error signal into the generated digital signal.

50. A simulator of transmission on an asynchronous transfer mode transmission network, comprising:

connection means for simulating the connection of a transmission/reception terminal to the network, means for generating a digital signal with a format and bit rate corresponding to a format and a bit rate which are standard for transmissions on the network, means for generating a signal representative of a simulated transmission error which comprises one of a binary error, a cell error, and a jitter phenomenon, and control and processing means for forming a processed signal by introducing the error signal into an incident signal, wherein said incident signal comprises one of (A) the generated digital signal and (B) a multiplexed signal formed by multiplexing the generated digital signal with a signal received from the terminal.

51. A simulator according to claim 50, further comprising means for transmitting the processed signal to a second transmission/reception terminal when the processed signal is formed by introducing the error signal into the generated digital signal.

* * * * *